(12) United States Patent
Margaritis

(10) Patent No.: US 9,048,951 B2
(45) Date of Patent: Jun. 2, 2015

(54) FREE SPACE OPTICS PHOTODETECTOR AND TRANSCEIVER

(76) Inventor: Georgios Margaritis, Los Altos, CA (US)

(*) Notice: Subject to any disclaimer, the term of this patent is extended or adjusted under 35 U.S.C. 154(b) by 1581 days.

(21) Appl. No.: 11/466,384

(22) Filed: Aug. 22, 2006

(65) Prior Publication Data

US 2007/0053698 A1 Mar. 8, 2007

Related U.S. Application Data

(60) Provisional application No. 60/714,084, filed on Sep. 2, 2005.

(51) Int. Cl.
*H04B 10/00* (2013.01)
*H04B 10/112* (2013.01)

(52) U.S. Cl.
CPC .................................. *H04B 10/1123* (2013.01)

(58) Field of Classification Search
USPC .................................................. 398/128, 130
See application file for complete search history.

(56) References Cited

U.S. PATENT DOCUMENTS

| | | | | |
|---|---|---|---|---|
| 5,493,406 A * | 2/1996 | Sawaki et al. | ................. | 356/73.1 |
| 5,497,419 A * | 3/1996 | Hill | ................. | 380/200 |
| 5,559,915 A * | 9/1996 | Deveau | ................. | 385/49 |
| 5,760,942 A * | 6/1998 | Bryant | ................. | 398/208 |
| 6,477,054 B1 * | 11/2002 | Hagerup | ................. | 361/720 |
| 6,631,302 B1 * | 10/2003 | Wilson | ................. | 700/59 |
| 6,834,165 B2 * | 12/2004 | Feng | ................. | 398/202 |
| 6,983,110 B2 * | 1/2006 | Buckman et al. | ................. | 398/212 |
| 2002/0003649 A1 * | 1/2002 | Feng | ................. | 359/189 |
| 2002/0013881 A1 * | 1/2002 | Delp et al. | ................. | 711/105 |
| 2002/0063773 A1 * | 5/2002 | Riepenhoff | ................. | 347/258 |
| 2003/0090668 A1 * | 5/2003 | Naya et al. | ................. | 356/445 |
| 2003/0095014 A1 * | 5/2003 | Lao et al. | ................. | 333/33 |
| 2004/0091270 A1 * | 5/2004 | Choi et al. | ................. | 398/130 |
| 2004/0240892 A1 * | 12/2004 | Abidin et al. | ................. | 398/214 |
| 2005/0129414 A1 * | 6/2005 | Guckenberger et al. | ................. | 398/202 |
| 2005/0141897 A1 * | 6/2005 | Takahashi et al. | ................. | 398/118 |
| 2005/0213883 A1 * | 9/2005 | Welch et al. | ................. | 385/37 |
| 2005/0276613 A1 * | 12/2005 | Welch et al. | ................. | 398/172 |
| 2006/0076473 A1 * | 4/2006 | Wilcken et al. | ................. | 250/214 A |

OTHER PUBLICATIONS

Integrated circuit. (1992). In Academic Press Dictionary of Science and Technology. Retrieved from http://www.credoreference.com/entry/apdst/integrated_circuit.*

* cited by examiner

*Primary Examiner* — David Payne
*Assistant Examiner* — Tanya Motsinger

(57) ABSTRACT

A novel optical detection apparatus is disclosed comprising a plurality of photodetectors and a plurality of transimpedance amplifiers wherein the photodetectors and the amplifiers are electrically connected to each other and are located in close proximity to each other, thus allowing the detecting of high frequency optical signals over a large detection area. Further, logical circuitry is disclosed for processing the signals generated from the photodetectors and for determining the strength of incoming light signals on various portions of the detection area.

9 Claims, 3 Drawing Sheets

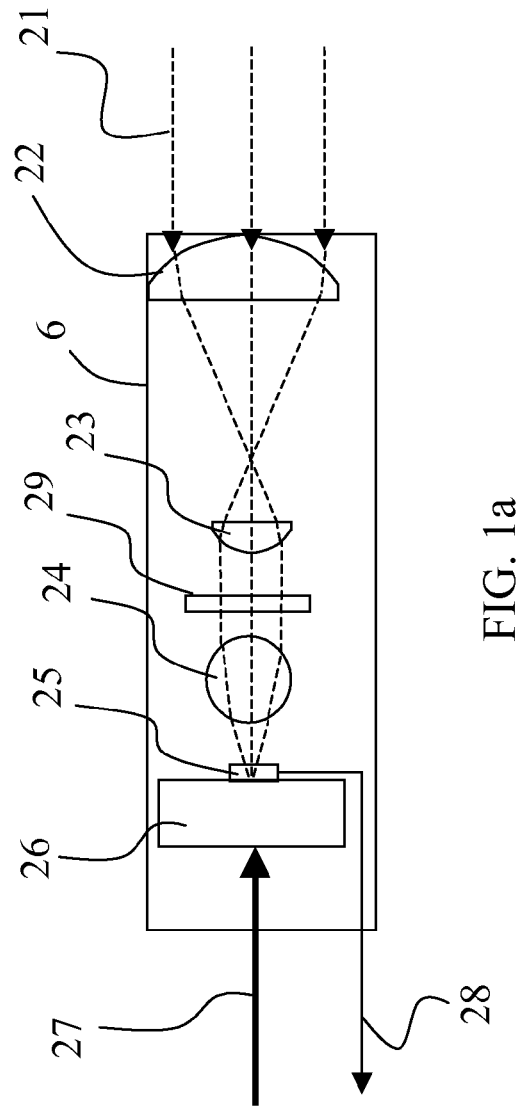
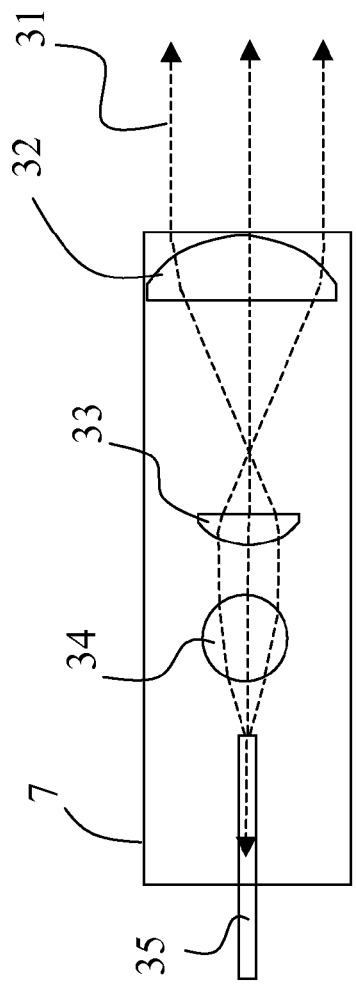
FIG. 1a
FIG. 1b

US 9,048,951 B2

FREE SPACE OPTICS PHOTODETECTOR AND TRANSCEIVER

This application claims the benefit of U.S. Provisional Application No. 60/714,084, filed on Sep. 2, 2005.

FIELD OF THE INVENTION

The present invention relates to the field of optical detection apparatuses used in optical communication systems.

BACKGROUND OF THE INVENTION

In free space optics an optical transceiver sends and receives optical signals from a second transceiver located some distance away. Alignment of the two transceivers is crucial for error free transmission of the signals exchanged between the two transceivers.

A photodetector is used in each of the transceivers to convert the optical signals to electrical signals to be processed by the electronic components of the transceiver. However, even if the transceivers are initially aligned properly, optical aberrations due to weather conditions or aging of the optical or mechanical components of the transceivers and misalignment of the transceivers due to mechanical forces from wind or other factors can lead to improper focusing of the incoming beam onto the photodetector, thus leading to errors in the transmission. Also, to detect high-speed optical signals it is necessary to use small low capacitance photodiodes, which further reduces the detection area and makes optical alignment of the receiver and transmitter difficult.

In this patent, a novel detection apparatus is introduced that uses a combination of photodetectors and transimpedance amplifiers in close proximity to reduce capacitance and distributed over a wide detection area, thus eliminating the issues related to prior art photodetectors.

SUMMARY OF THE INVENTION

A novel detection apparatus is disclosed that includes a plurality of photodetectors and a plurality of transimpedance amplifiers. Each photodetector is electrically connected to one transimpedance amplifier, which is located in close proximity to the photodetector. Each photodetector and amplifier combination forms a low capacitance optical detection cell capable of detecting high-speed optical signals. The presence of multiple such cells in the apparatus of this invention provides a wide detection area for incoming optical signals. Further, the apparatus of this invention includes logical circuitry to process the signals generated from the photodetectors and to determine the strength of incoming light signals on various portions of the detection area.

LIST OF FIGURES

FIG. 1a shows one embodiment of the receive optics of the transceiver of this invention.

FIG. 1a shows one embodiment of the transmit optics of the transceiver of this invention.

DESCRIPTION OF THE INVENTION

Figure 2:
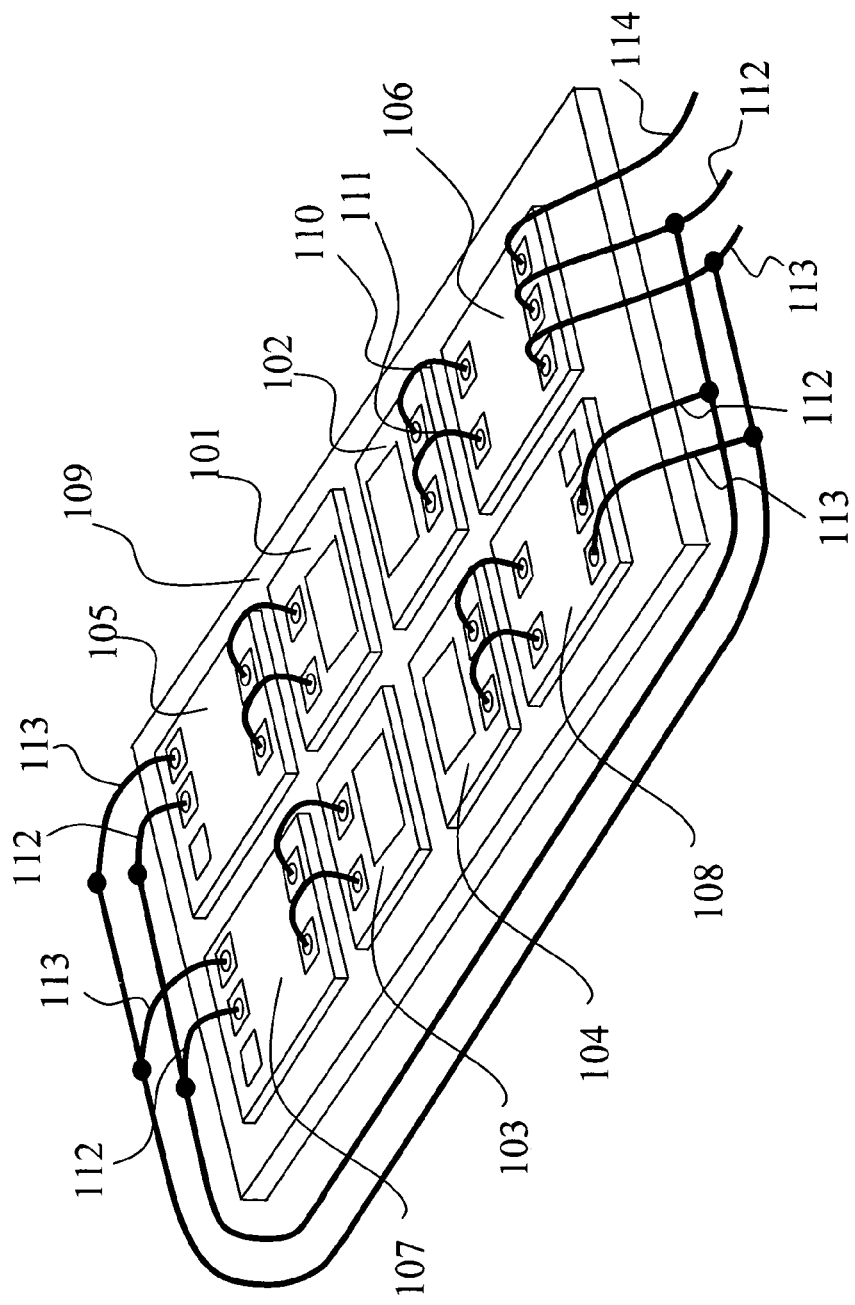
FIG. 2 shows one embodiment of the photodetector of this invention.

FIG. 1a shows one embodiment of the receive optics of the transceiver of this invention. It includes a lens 22, such as a plano-convex lens from Thorlabs, attached to the front end of a tube 6. A single planoconvex lens or a system of lenses 23 (plano-convex) and 24 (ball lens), along with lens 22 (plano-convex) focus an incoming laser beam 21 onto a photodetector 25, as described later in this invention. Several lens vendors offer lenses that can be used in this invention, such as those from Thorlabs or Edmund Optics. The photodetector 25 is attached to a motorized X-Y-Z stage 26, such as a set of three MX80L Parker Daedal stages in an X-Y-Z configuration with an associated driver such as a ViX driver. A band-pass optical filter 29, such as an Edmund Optics DWDM dielectric bandpass filter, is also used in the optical path to allow only predetermined optical wavelengths to pass through.

FIG. 1b shows one embodiment of the transmit optics of the transceiver of this invention. It includes an optical fiber 35 entering one end of tube 7. A system of lenses 34, 33 (both plano-convex lenses) and 32 (ball lens), expand the laser beam carried by the fiber and emit it into free space 31.

FIG. 2 shows one embodiment of the photodetector 25 of FIG. 1a of this invention. It includes a plurality of single chip photodiodes, 101, 102, 103, 104, such as Fermionics FD100 photodiodes, attached to a substrate 109, such as an alumina ceramic substrate. The photodiodes are connected to a plurality of transimpedance amplifiers (TIA) 105, 106, 107, and 108, such as Maxim MAX 3657 TIAs, by means of wirebonds, 110, and 111 for photodiode 102, and transimpedance amplifier 106, and similarly for the remaining photodiodes and TIAs. Each one of the TIAs has two differential outputs, one plus and one minus, for example 112 for plus and 113 for minus for TIA 106 and one output for the photodiode average current, 114 for TIA 106. All the plus outputs of all TIAs are connected together by, for example, connecting all the plus wires such as 112 together. Similarly all the minus outputs of all TIAs are connected together by, for example, connecting all the minus wires such as 113 together. Also, connections can be done by wirebonding the TIA outputs to pads on the alumina substrate and then using copper traces in the alumina substrate to connect the outputs together.

Figure 3:
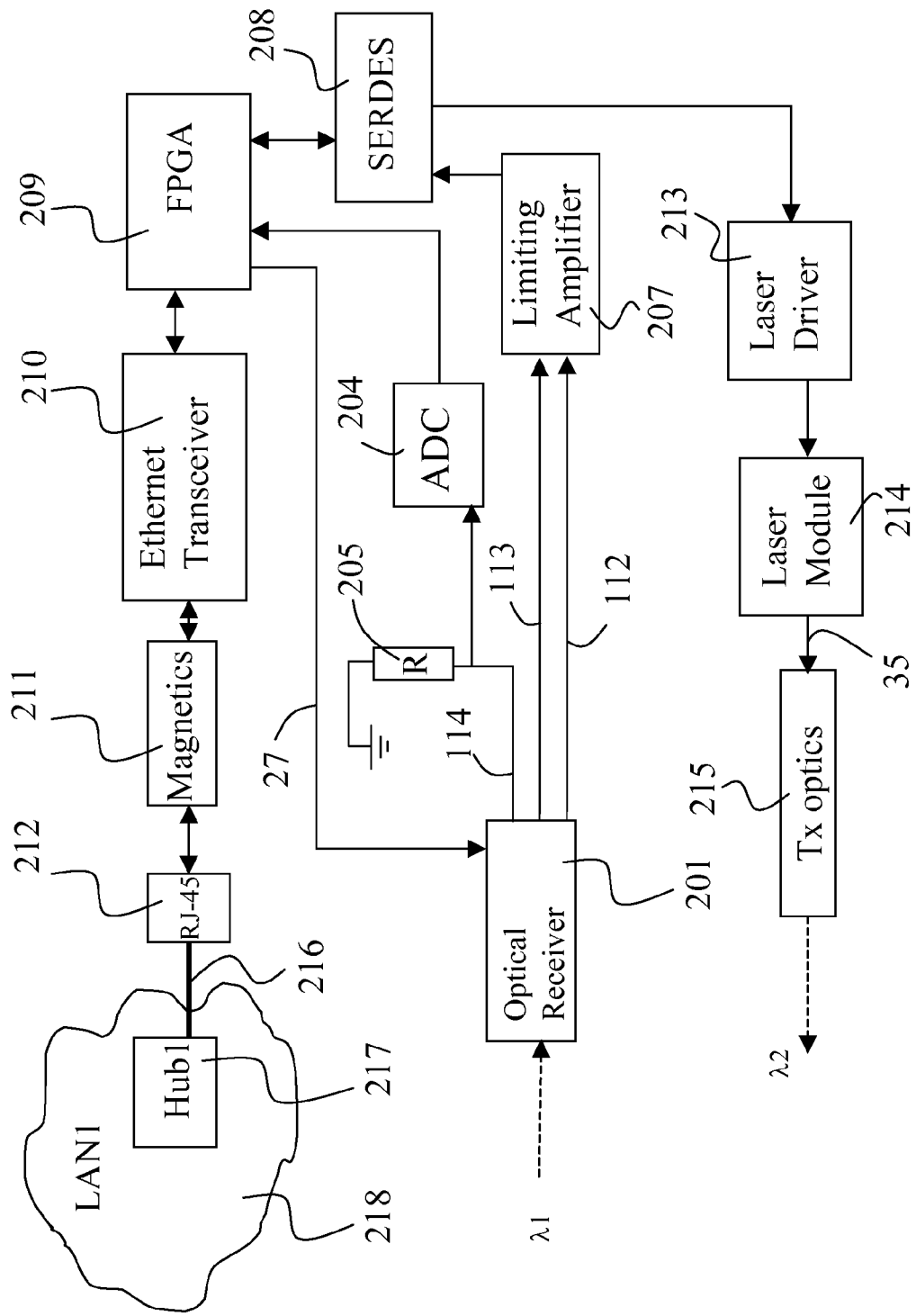
FIG. 3 shows one embodiment of the electronic components of the transceiver of this invention.

FIG. 3 shows one embodiment of the electronic components of the transceiver of this invention. The differential outputs 112 and 113 of the photodetector 25 of FIG. 1a is input into a limiting amplifier 207, and the photodiode average current output 114 that is converted to voltage by means of a resistor 205 is input into an analog to digital converter (ADC) 204, such a National Semiconductor ADC0801. The output of the ADC 204 is input into a field programmable gate array (FPGA) 209, such as a Xilinx Virtex FPGA.

The FPGA 209 receives the output of the ADC 204, and generates control signals 27 that drive the servomotors of the X-Y-Z stage 26, to maximize the photodiode current 114. The FPGA can either implement a Verilog code, or have an embedded CPU that executes instructions to generate the appropriate motor control signals. There are several Prior Art techniques for controlling a set of servomotors to maximize a feedback variable.

Further in FIG. 3, the limiting amplifier 207 is connected to a transceiver IC (SERDES) 208, such as an Intel LXT971A. The SERDES 208 is connected to the FPGA 209. The FPGA 209 is connected to an Ethernet transceiver IC 210, such as an Intel LXT971A (note that the same type of IC is used as SERDES and Ethernet transceiver). The Ethernet transceiver IC 210 is connected to an isolation transformer 211, such as four Pulse PE68515, which in turn is connected to a RJ-45 connector 212. The SERDES 208 is also connected to a laser driver 213, such as a Maxim MAX 3668, that drives a single mode laser module 214, such as a Sumitomo SLT4460. The fiber 35 is connected at one end to the output of the laser module 214 and coupled at the other end to the transmit optics 7.

Numerous other embodiments of the present invention are also possible. For example, the receive and transmit optics can be replaced by a different lens or system of lenses or mirrors (singlets, doublets, parabolic reflectors) that accomplish the function of focusing the incoming laser beam for the receiver, and expanding and collimating the outgoing laser beam. Also, several different types of motors and controllers can be used in place of the servomotors, such as stepper motors and controllers, linear stages, piezoelectric motors etc. Also, manual control of the X-Y-Z stage 26 can also be implemented, by for example attaching micrometers, as is well known to the prior art.

Also, in FIG. 2, the photodiode array could be in a separate substrate from the TIAs, provided that the connections between the photodiodes and the TIAs do not add significant capacitance to the system, which could be detrimental to its performance. A single chip solution for both the photodiode array and the TIAs could also be implemented. Further, although four photodiode/TIA combinations are shown in FIG. 2, any number of photodiodes/TIA combinations could be implemented. Further, the TIAs need not be connected to each other thus providing information on the strength of the incoming signal at the various portions of the photodetector array. That information can be used by the transceiver to adjust the position of the photodetector array, by means of the motors, to maximize the strength of the incoming signal.

I claim:

1. An optical detection apparatus comprising,
   (i) an electrically passive rigid substrate,
   (ii) a plurality of photodiodes attached to a surface of said rigid substrate,
   (iii) a focusing lens that focuses an incoming light beam about a single optical axis onto entire said plurality of photodiodes,
   (iv) a plurality of low capacitance high speed optical detection cells, each cell comprising a transimpedance amplifier attached to said rigid substrate and placed in close proximity to a paired photodiode, selected from said plurality of photodiodes, and electrically connected to said paired photodiode by means of an electrical connection that does not add significant capacitance to the cell, and wherein each transimpedance amplifier of each optical detection cell includes a plus and a minus output and wherein all plus outputs of all transimpedance amplifiers are connected together into a combined plus output and all minus outputs of all transimpedance amplifiers are connected together into a combined minus output,
   (v) amplification means for amplifying said combined plus and minus outputs.

2. The apparatus of claim 1 wherein said amplification means include a limiting amplifier.

3. The apparatus of claim 1 wherein the electrical connection between the transimpedance amplifier and the paired photodiode of each optical detection cell is done by means of wirebonds.

4. The apparatus of claim 1 wherein said rigid substrate further includes electrically conductive traces.

5. The apparatus of claim 1 wherein said rigid substrate is made of a ceramic material.

6. The apparatus of claim 1 wherein said plurality of photodiodes is a plurality of single chip photodiodes.

7. The apparatus of claim 1 wherein said focusing lens is a single spherical lens that focuses said incoming light beam onto entire said plurality of photodiodes.

8. The apparatus of claim 1 further comprising an analog to digital converter and logical circuitry for analyzing the signals generated from said plurality of photodiodes and for determining the strength of an incoming light signal.

9. The apparatus of claim 8 wherein said logical circuitry includes a device selected from the group consisting of FPGA, DSP and CPU.

* * * * *